(12) United States Patent
Jurlina et al.

(10) Patent No.: US 6,641,445 B1
(45) Date of Patent: Nov. 4, 2003

(54) DEPLOYMENT ARRANGEMENT FOR INFLATABLE STRUCTURES

(75) Inventors: Thomas A. Jurlina, Wall Township, NJ (US); Louis A. Cassano, Point Pleasant, NJ (US); Charles Smith, Jackson, NJ (US)

(73) Assignee: Air Cruisers Company, Wall, NJ (US)

( * ) Notice: Subject to any disclaimer, the term of this patent is extended or adjusted under 35 U.S.C. 154(b) by 0 days.

(21) Appl. No.: 10/075,255

(22) Filed: Feb. 15, 2002

(51) Int. Cl.[7] .............................................. B63C 9/00
(52) U.S. Cl. ........................................ 441/80; 441/41
(58) Field of Search .............................. 244/107; 222/3; 251/294; 441/90, 91, 92, 93, 94, 96, 99, 41, 80

(56) References Cited

U.S. PATENT DOCUMENTS

| | | | |
|---|---|---|---|
| 1,818,597 A | * | 8/1931 | Adams et al. ............... 244/107 |
| 2,264,321 A | * | 12/1941 | Manson ....................... 244/107 |
| 3,165,763 A | * | 1/1965 | Gaylord |
| 3,910,532 A | | 10/1975 | Fischer |
| 4,104,964 A | | 8/1978 | Larkworthy et al. |
| 4,457,730 A | | 7/1984 | Foster et al. |
| 4,460,343 A | | 7/1984 | Heimovics, Jr. et al. |
| 4,566,862 A | | 1/1986 | Halavais |
| 4,577,817 A | | 3/1986 | Hernandez |
| 4,595,374 A | * | 6/1986 | Wass ............................ 441/35 |
| 4,666,413 A | | 5/1987 | Klein et al. |
| 5,284,453 A | | 2/1994 | Kun |
| 5,586,615 A | | 12/1996 | Hammer et al. |
| 5,806,572 A | | 9/1998 | Voller |
| 5,871,180 A | | 2/1999 | Hublikar |
| 5,875,868 A | | 3/1999 | Smialowicz et al. |
| 5,975,467 A | | 11/1999 | O'Donnell et al. |
| 5,988,438 A | | 11/1999 | Lewis et al. |
| 6,298,970 B1 | | 10/2001 | Targiroff et al. |

\* cited by examiner

Primary Examiner—Ed Swinehart
(74) Attorney, Agent, or Firm—Lawrence G. Fridman

(57) ABSTRACT

An arrangement for deployment of an inflatable structure consisting of a pressurized container, a cable and a cable guide block. At least one conduit extends within the cable guide block. The cable is positioned for guided movement within the conduit. Such guided movement of the cable within the conduit under the applied pull force causes activation of the pressurized container and inflation of the inflatable structure by the pressurized fluid.

18 Claims, 6 Drawing Sheets

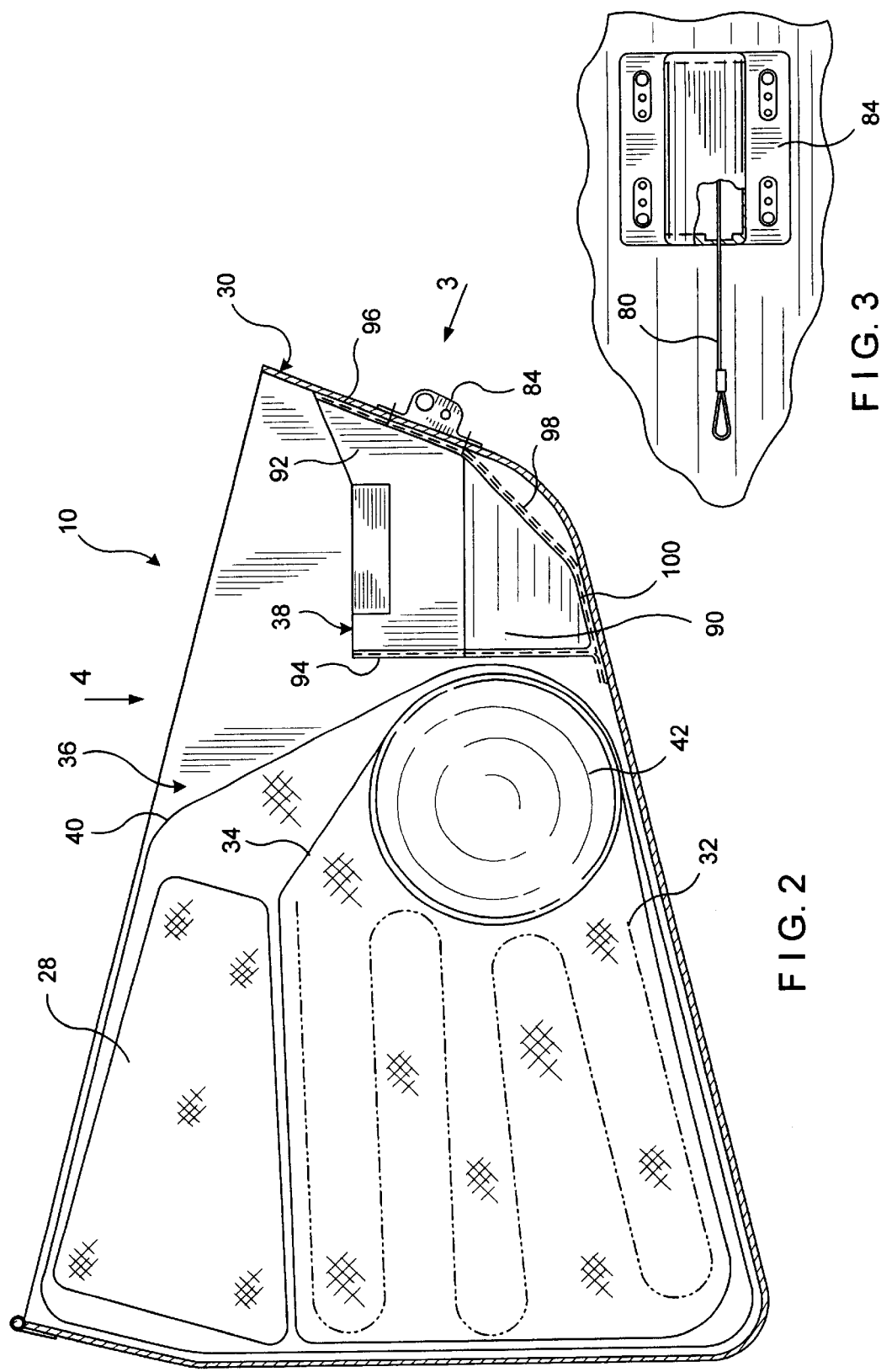

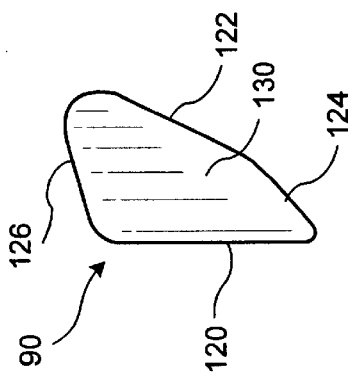
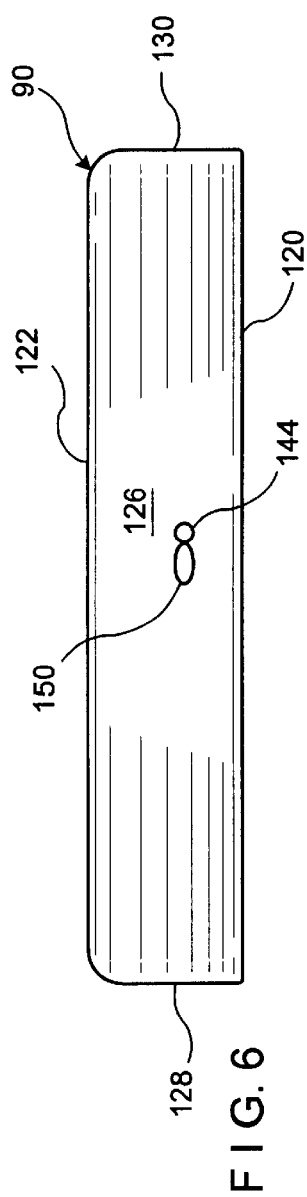
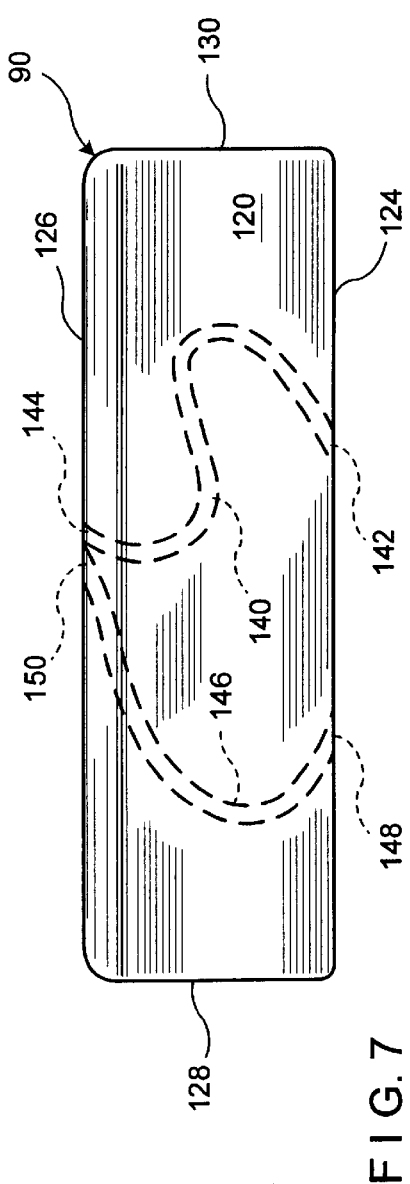
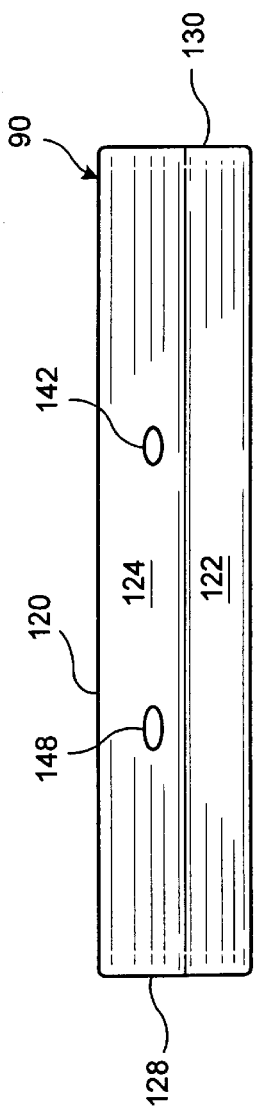
FIG. 9
FIG. 6
FIG. 7
FIG. 8

DEPLOYMENT ARRANGEMENT FOR INFLATABLE STRUCTURES

BACKGROUND OF THE INVENTION

1. Field of the Invention

This invention relates generally to the deployment of inflatable structures, and more particularly to an arrangement for deployment of evacuation slides or life rafts associated with aircraft.

2. Description of the Related Art

Inflatable evacuation slides and/or slide rafts provide a rapid means for evacuating passengers and flight personnel in the event of an emergency. In commercial aircraft, the slides are normally stored uninflated in a container mounted on the interior of the aircraft door or immediately adjacent thereto. With the door closed, a girt bar is connected to brackets on the floor inside the doorway such that it is only necessary to open the door to automatically deploy the slide in the event of an emergency evacuation. When the door is opened, the girt bar normally pulls the slide through the doorway until gravity can take effect to unfold or unroll the slide outside of the doorway. Once outside the doorway, the slide or slide/raft is rapidly inflated through the application of fluid pressure.

In military applications, inflatable life rafts and their deployment systems are sometimes located in wing compartments of the aircraft. This is often necessary to maximize space in the fuselage for transporting equipment, supplies and personnel. A pair of life rafts and the deployment systems associated therewith may be located within a special compartment situated in each wing. This compartment is formed with a separate chambers for the life raft and the deployment system. In the prior art the deployment system for each life raft includes a container of highly pressurized gas that is located in a bottle chamber adjacent the life raft chamber. Such container includes an inflation valve that is actuable from a remote location, such as the cockpit, by a cable and pulley system routed through the aircraft. When a pull handle or similar device associated with the cable is activated, the valve is opened and the pressurized gas is discharged from the container and into the life raft causing its rapid inflation.

The use of vacuum-sealed inflatable life rafts in the wing compartments of military aircraft, such as the Lockheed Martin C-130 and C-141 aircraft, has become increasingly popular due to their compact size and the protection they afford against water, moisture, fungus growth, and debris. Typically, the container of highly pressurized gas is located in a sealed envelope together with the life raft in the life raft chamber. Consequently, the bottle chamber is no longer utilized.

Similarly, when non vacuum-packed life rafts are provided within the wing compartments, the container with pressurized gas utilized for the deployment of the inflatable structure is also currently repositioned from the bottle chamber into the life raft receiving chamber. This keeps the bottle chamber empty. In both current vacuum-packed and non vacuum-packed applications the cable used to deploy the life raft is typically now routed through both the fairlead assembly and the voided area of the bottle chamber and into the life raft chamber. Such arrangement results in a significant amount of slack in the cable. In some aircraft, the stroke length of the cable for activating the life raft is limited to approximately 3 to 5 inches. Thus, if the slack in the cable exceeds this distance, the life raft cannot be deployed. This problem is augmented in turboprop aircraft, where a large amount of vibration is generated in the wings and in the life raft due to the location of the turbo engines on the wings. Modifications to the aircraft to overcome this problem are usually costly, require a complex procedure of recertification of the aircraft and therefore are undesirable.

Whether the life raft is non-vacuum-packed, vacuum-packed or of any other configuration, it may become necessary to remove the life raft during maintenance procedures. Currently, when a life raft is removed from a wing compartment, the life raft actuating cable must be disengaged from the aircraft cable (that leads from the cockpit to the life raft cable) from underneath the wing of the aircraft. This is accomplished by extending the aircraft's wing flaps to gain access to the underside of the wing, where a safety wire is removed from a clevis of the aircraft's cable and a screw connection is removed between the aircraft cable and the life raft cable. Once the aircraft cable and life raft cable are disconnected from each other, the life raft can be removed by unlatching the compartment doors located on top of the wing. Thus, removal of the life raft requires access to both the bottom and top of the wing, resulting in a time-consuming and labor intensive procedure.

It would therefore be desirable to provide an arrangement for reducing the slack and/or vibration in a life raft actuating cable, to thereby assure deployment of the life raft within the required stroke length. It would be further desirable to provide a mechanism for facilitating life raft installation in, and removal from, the wing compartment of an aircraft.

SUMMARY OF THE INVENTION

One aspect of the present invention provides an arrangement for deployment of an inflatable structure. The arrangement comprises a container fluidly connectable to the inflatable structure. The container has a pressurized fluid situated therein and a valve movable under force from a closed position while maintaining the pressurized fluid in the container to an open position in which the pressurized fluid is expelled from the container into the inflatable structure for its inflation. The arrangement further comprises a cable guide block having first and second sides, and at least a first conduit extending between the first and second sides. A deployment cable is positioned for guided movement in the first conduit between a rest position and a deployed position. The deployment cable has first and second ends that extend beyond the first and second sides, respectively, with the first end being operably connected to the valve and the second end being accessible for applying a pull force to the deployment cable. With this arrangement, guided movement of the deployment cable in the first conduit from the rest position to the deployed position under the applied pull force causes opening of the valve and inflation of the inflatable structure by the pressurized fluid.

A further aspect of the invention provides an arrangement for deployment of a life raft in an aircraft. The aircraft has left and right wings, a wing compartment located in each wing with a first chamber for receiving the life raft and a second chamber formed independently of the first chamber, and an aircraft cable for remotely actuating the life raft. A life raft is adapted for positioning in the first chamber and a container adapted for positioning in the first chamber with the life raft. The container is fluidly connectable to the life raft and has a compressed fluid situated therein and a valve movable under force from a closed position while maintaining the compressed fluid in the container to an open position in which the compressed fluid is expelled from the container into the life raft for its inflation. The arrangement further comprises a cable guide block that is adapted for positioning in the second chamber. The cable guide block has first and second sides, and at least a first conduit extending between the first and second sides. A deployment cable is positioned for guided movement in the first conduit between a rest position and a deployed position. The deployment cable has first and second ends that extend beyond the first and second sides, respectively, with the first end being operably connected to the valve and the second end being adapted for connection to the aircraft cable for remotely applying a pull force to the deployment cable. With this arrangement, guided movement of the deployment cable in the first conduit from the rest position to the deployed position under the applied pull force causes opening of the valve and inflation of the life raft by the pressurized fluid.

An even further aspect of the invention provides a cable guide block for redirecting a pull force of a cable from a first direction to a second direction. The cable guide block comprises a body having at least first and second sides and at least one tubular member embedded within the body and extending between the first and second sides. The tubular member is shaped to extend along both the first and second directions. A cable is positioned for guided movement in the tubular member. The cable has first and second ends extending beyond the first and second sides, respectively, so that the first cable end extends along the first direction and the second cable end extends along the second direction to thereby redirect a pull force on the cable from the first direction to the second direction.

The foregoing and other features and advantages of the invention will be apparent from the following more particular description of preferred embodiments of the invention, as illustrated in the accompanying drawings.

BRIEF DESCRIPTION OF THE DRAWINGS

The preferred embodiments of the present invention will hereinafter be described in conjunction with the appended drawings which are provided to illustrate and not to limit the invention, where like designations denote like elements, and wherein:

FIG. 2 is a sectional view of a wing compartment of an aircraft with a life raft and inflation bottle located in one chamber of the wing compartment and a cable guide device located in an adjacent chamber of the wing compartment in accordance with the present invention;

FIG. 3 is a side elevational view of a portion of the wing compartment as viewed in the direction of arrow 3 in FIG. 2 and illustrating the fairlead assembly;

FIG. 6 is a elevational view of a cable guide block in accordance with a first embodiment of the present invention;

FIG. 7 is a top plan view of the cable guide block;

FIG. 8 is a front view of the cable guide block;

FIG. 9 is a side elevational view of the cable guide block;

It is noted that the drawings are intended to depict only typical embodiments of the invention, and therefore should not be considered as limiting the scope thereof. The invention will now be described in greater detail with reference to the accompanying drawings.

DETAILED DESCRIPTION OF THE PREFERRED EMBODIMENTS

Figure 1:
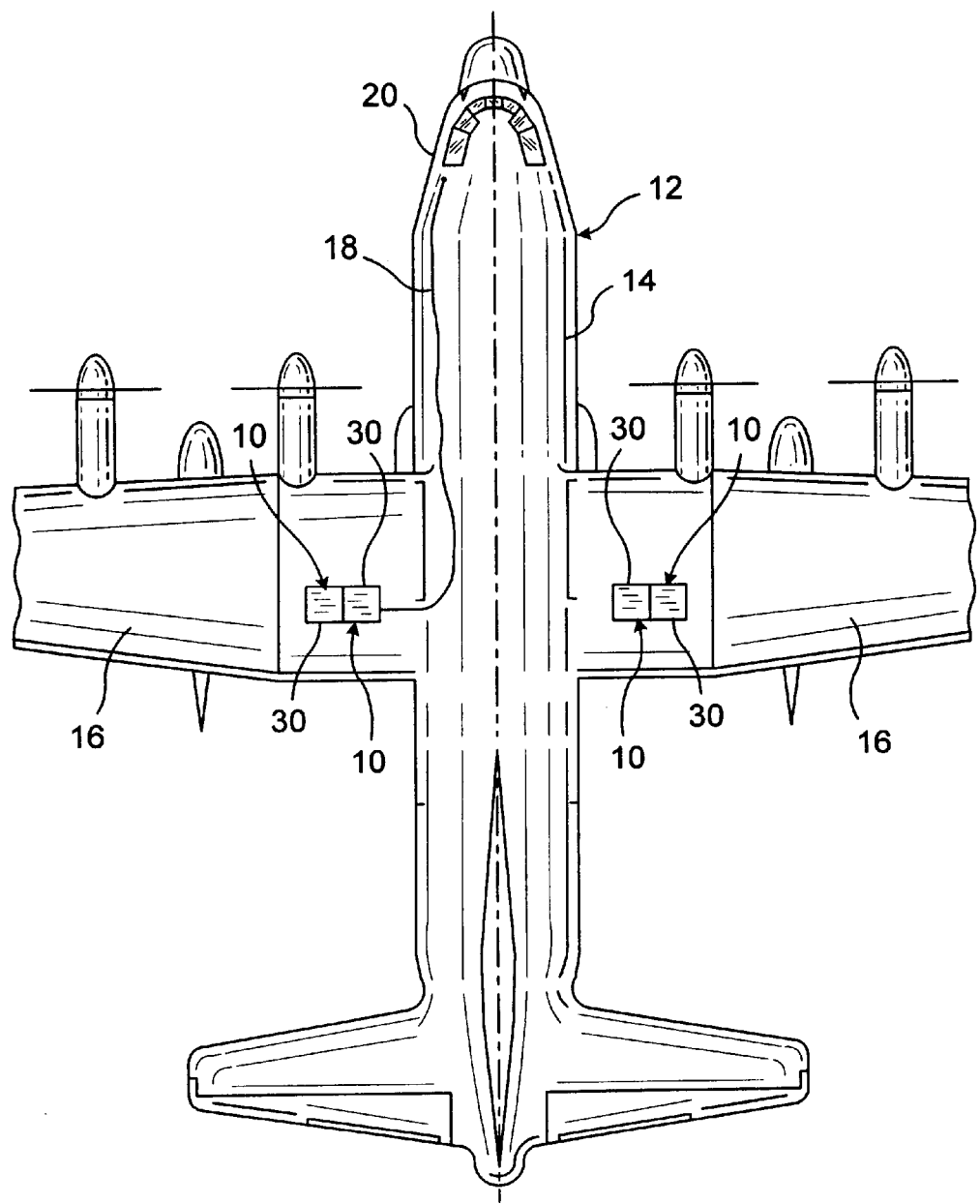
FIG. 1 is a top plan view of a system for deploying an inflatable life raft according to an exemplary embodiment of the invention installed in an aircraft.

Referring now to the drawings, and to FIG. 1, in particular, a deployment arrangement 10 according to the present invention for inflating a life raft is illustrated. Preferably, the deployment arrangement 10 is installed in an aircraft 12 having a fuselage 14 and wings 16. As shown, two deployment arrangements 10 are provided in each wing 16. However, it will be understood that more or less deployment arrangements 10 can be provide in each wing and/or other parts of the aircraft 12. An aircraft cable 18 preferably extends between the deployment arrangements 10 and the cockpit area 20 of the aircraft 10 for actuating the deployment arrangements from the cockpit area.

With reference now to FIGS. 2–5, each deployment arrangement 10 is positioned together with an inflatable life raft 32 in a carrying case 40 which is in turn located within a compartment 30 of the aircraft wing 16 (FIG. 1). The compartment 30 is divided into a first chamber 36 adapted for receiving the life raft 32 and related components, and a second chamber 38 which in the prior art accommodates the container with a pressurized gas used in the deployment of the inflatable structure. In the invention the second chamber 38 is adapted for receiving a cable guide block 90, as will be described in greater detail below.

The life raft 32 is of conventional construction and can be packaged in an envelope 34 together with a primary cylinder or container 42 for inflating the life raft. The life raft 32 can be in a non-sealed condition or can be vacuum-sealed in a well known manner to reduce the size of the package. The envelope 34 is preferably constructed from plastic material, such as PVC film or other polyester material, but may alternatively be constructed of nylon, polyurethane, or other materials impermeable to air and moisture. The plastic material is preferably heat sealed together around its edges to form the envelope 34. Alternatively, the envelope 34 can be constructed of a plastic material that has been folded on itself and sealed at its edges.

Figure 4:
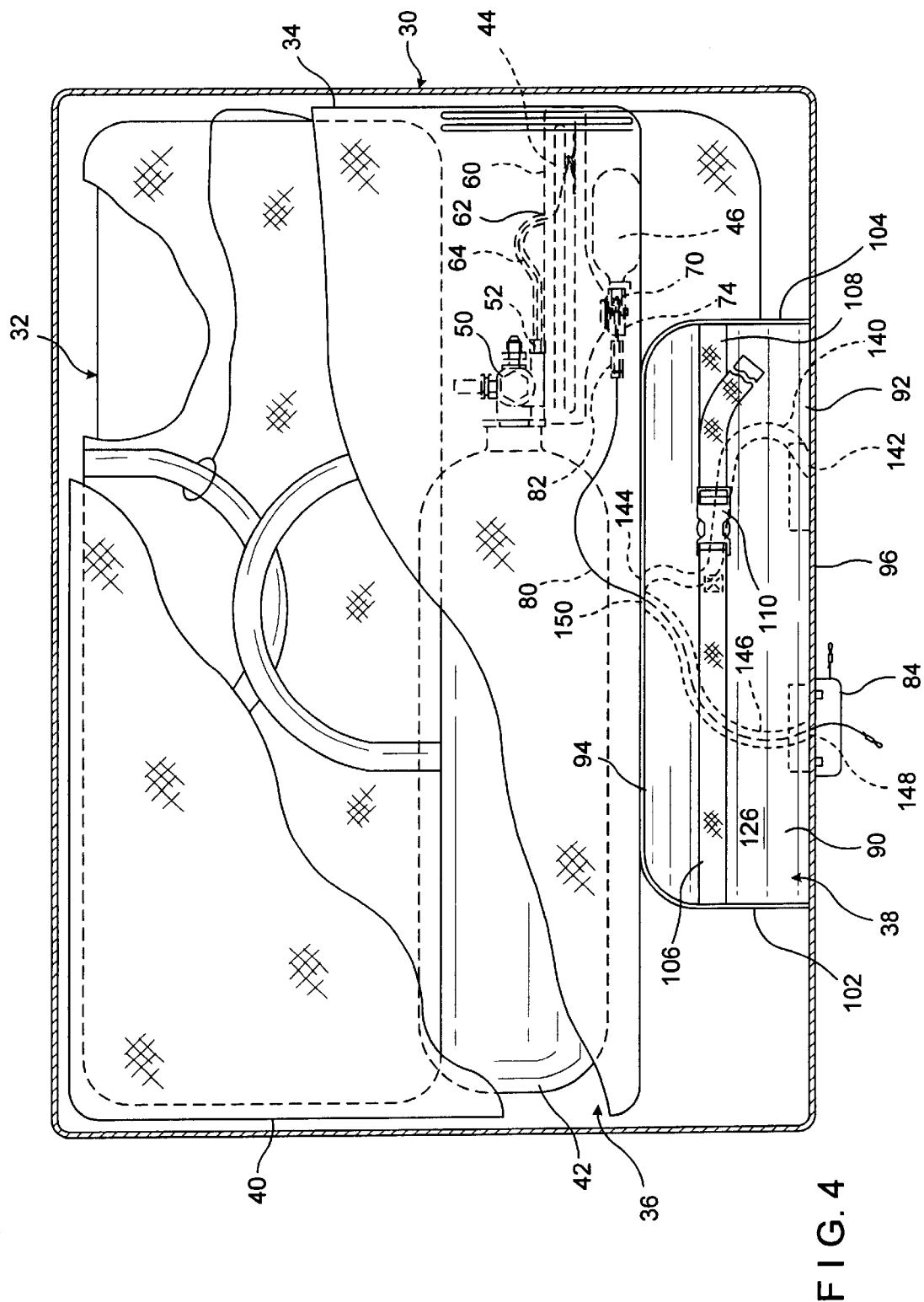
FIG. 4 is a top plan view of the deployment system as viewed in the direction of arrow 4 in FIG. 2.

In one embodiment of the invention, when the vacuum-sealed life raft is utilized as shown in FIG. 4, the deployment arrangement 10 includes the primary cylinder or container 42 that is pressurized with a primary fluid for inflating the life raft 32, an inflatable actuator bag 44 for actuating the primary cylinder 42, and a secondary cylinder or container 46 that is pressurized with a secondary fluid for inflating the actuator bag 44.

The primary cylinder 42 has a primary valve 50 of conventional construction that is preferably located in the vicinity of the envelope 34 and can be subject to vacuum force within the envelope. The primary valve 50 includes a primary valve actuator 52 that can be pulled or otherwise manipulated for manually opening the primary valve 50 and discharging the pressurized fluid from the primary cylinder into the life raft 32. With this arrangement, the inflatable actuator bag 44 is also subject to the vacuum force that is present in the envelope 34 when the life raft 32 is vacuum packed.

A first connecting arrangement, such as a cord or lanyard 64, extends into the inflatable actuator bag 44 from the primary valve actuator 52 through the small gap 62. Preferably, one end of the lanyard is connected to the primary valve actuator 52 in a well-known manner, while the opposite end is connected to the actuator bag 44.

The secondary cylinder 46 has a secondary valve 70 with a secondary nozzle that is sealingly connected to the inflatable actuator bag 44 for discharging fluid under pressure from the secondary cylinder 46 and into the inflatable actuator bag. The secondary valve 70 includes a secondary valve actuator 74 that can be pulled or otherwise manipulated for manually opening the secondary valve 70. The secondary valve actuator 74 is in turn connected to a deployment cable 80 through a quick disconnect 82 of well-known construction. The deployment cable 80 extends through the cable guide 90 located in the second chamber 38, as will be described in greater detail below. A distal end of the deployment cable 80 passes through the fairlead assembly 84 of the aircraft, which is located underneath the wing compartment, and connects to the aircraft cable 18.

The secondary cylinder 46, including the secondary valve 70, is also preferably of conventional construction. As such, the secondary valve actuator allows pressurized gas to escape through the secondary valve 70 for charging the inflatable actuator bag 44. Inflation of the actuator bag 44 in turn causes the lanyard 64 to pull on the primary valve actuator 52 to thereby release pressurized gas from the primary cylinder 42 and into the life raft 32. Further details of the construction and operation of this deployment system can be found in our copending U.S. patent application Ser. No. 10/023,749 filed on Dec. 21, 2001, the disclosure of which is hereby incorporated by reference.

In another embodiment of the invention, when the life raft is not vacuum-packed, the deployment arrangement includes only the primary container 42 assembly having the primary valve 50 with the primary valve actuator 52. This arrangement does not include the secondary inflatable system in the form of inflatable actuator bag 44, secondary valve 70, etc. Thus, the lanyard 62 adapted for activation of the valve actuator 52 is directly or indirectly connected to the aircraft cable 18.

Referring again to FIGS. 2, 4 and 5, in both embodiments of the invention, due to the reduced size of the life raft 32, there is room within the carrying case 40 for one or more accessory containers 28 that can be used for storing survival kit items. The size of the accessory container 28 can vary in size, depending on the number and type of survival kit items located in the accessory container. The carrying case 40 can be used to lift the life raft 32 and its accessory items in and out of the aircraft. In the past, the carrying case would usually hold the life raft and the accessory container. However, the prior art design required a hole in the carrying case to allow communication with a pressurized cylinder positioned in the second chamber 38. In contrast, the present invention provides a much more compact life raft arrangement which, in combination with the primary cylinder 42, etc. and other accessories are positioned in the carrying case 40 in the first chamber 36. In this manner, the arrangement of the invention can be readily removed from the aircraft by accessing the wing compartment through the top of the wing and simply disconnecting the quick disconnect 82 between the primary cylinder 42 or the secondary cylinder 46 and the deployment cable 80. Accordingly, it is no longer necessary to access the fairlead assembly 84 from underneath the wing, as in the prior art arrangements. Thus, the carrying case 40 with its contents can be easily disconnected and removed.

Figure 5:
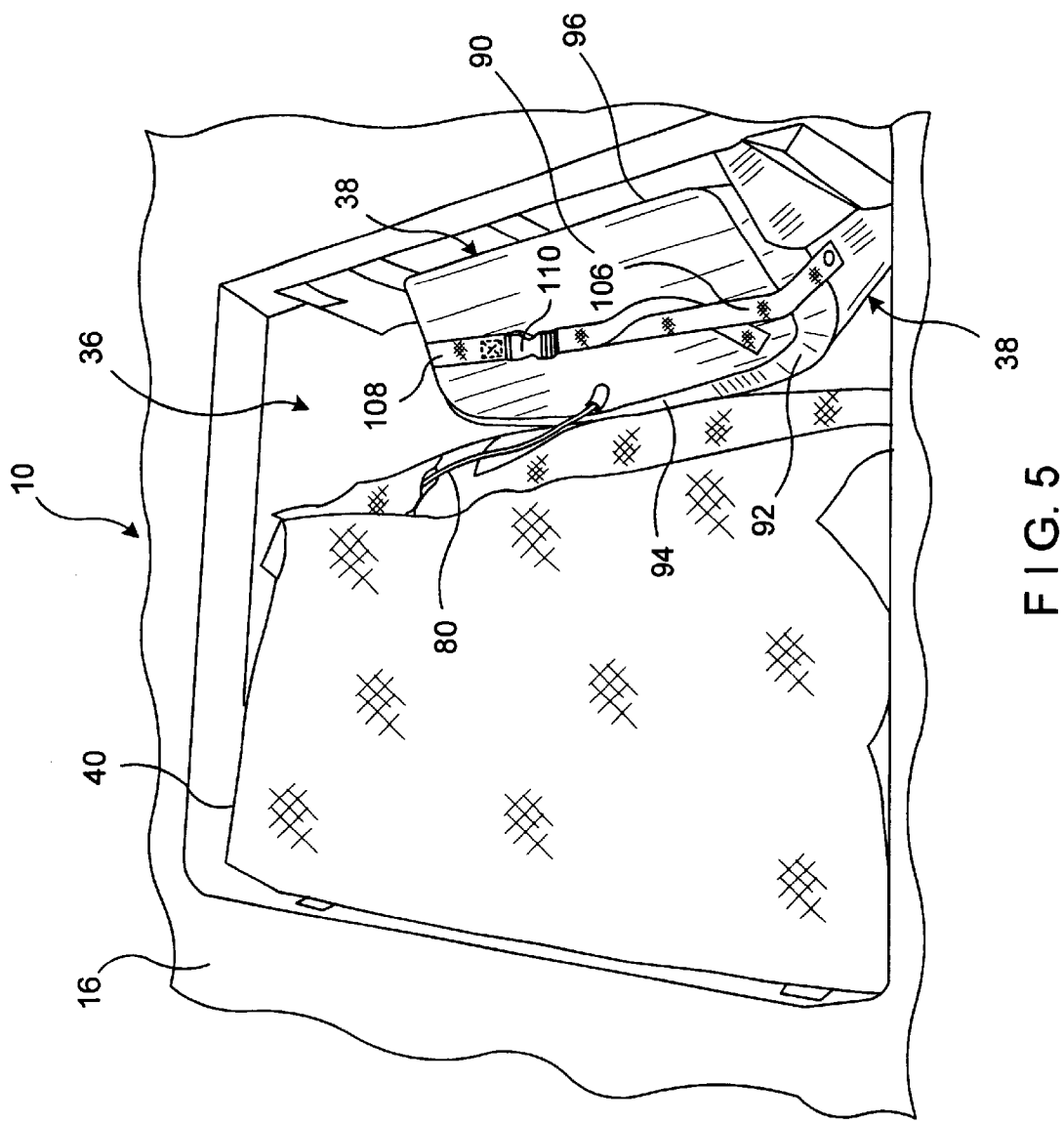
FIG. 5 is a perspective view of the wing compartment and deployment system of FIG. 1.
Figure 13:
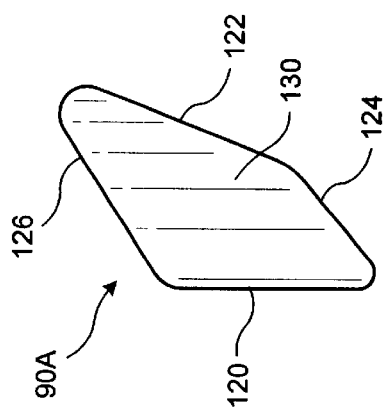
FIG. 13 is a side elevational view of the cable guide block second embodiment.
Figure 10:
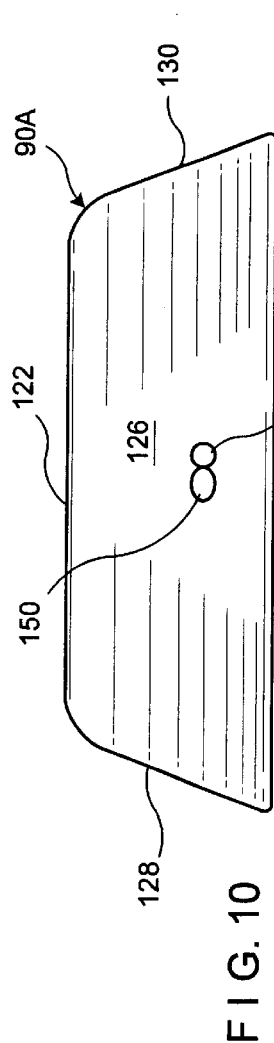
FIG. 10 is a rear elevational view of a cable guide block in accordance with a second embodiment of the present invention.
Figure 11:
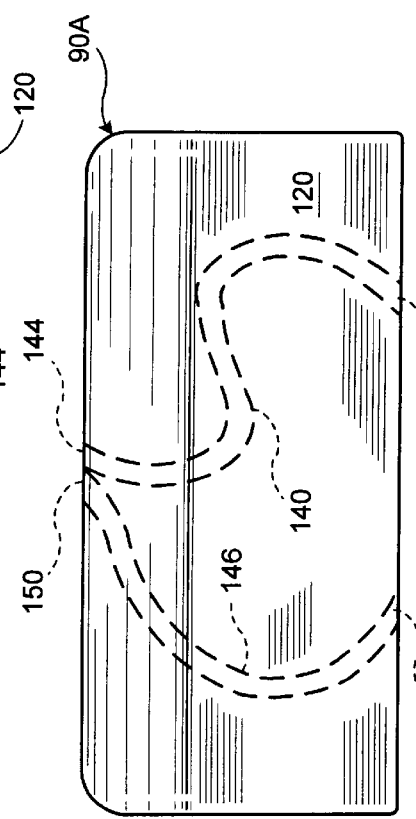
FIG. 11 is a top plan view of the cable guide block second embodiment.
Figure 12:
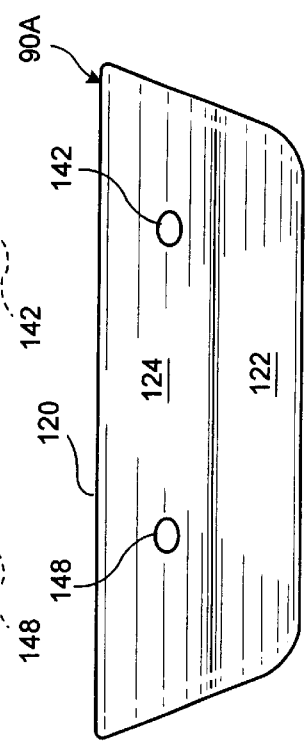
FIG. 12 is a front elevational view of the cable guide block second embodiment.

A liner 92 is positioned in the second chamber 38 of the aircraft, and preferably substantially conforms to its interior configuration. As best illustrated in FIGS. 2, 4 and 5, the liner 92 is preferably formed of a composite material, such as fiberglass, and includes a rear wall 94, an upper front wall 96, a lower front wall 98 extending downwardly and rearwardly from the upper front wall, a bottom wall 100 extending between the lower front wall 98 and the rear wall 94, and side walls 102, 104 extending between the upper and lower front walls, the rear wall, and the bottom wall to form a hollow interior into which the cable guide block 90 is received. The cable guide block 90 is held taut in the second chamber 38 by straps 106, 108 and an associated adjustable buckle assembly 110 for connecting the straps together in a well known manner. The straps 106, 108 preferably extend underneath the cable guide block 90 and exit through access holes (not shown) in the second chamber 38.

With additional reference to FIGS. 6–9, the cable guide block 90 preferably conforms to the shape of the liner 92 and includes a rear surface 126, a front surface 124, a bottom surface 122 and a top surface 120 extending between the front and rear surfaces, and side surfaces 128, 130 extending between the front, rear, top and bottom surfaces to form a generally trapezoidal-shaped guide block 90. An essential feature of the invention is that one guide block design is capable of accommodating both left and right wing installations. For this purpose, the guide block 90 is formed with the first and second conduits. The first generally S-shaped conduit 140 extends through the guide block 90 and has a cable inlet 142 at or adjacent the front surface 124 and a cable outlet 144 at or adjacent the rear surface 126. Likewise, a second generally C-shaped conduit 146 extends through the guide block 90 and has a cable inlet 148 at or adjacent the front surface 124 and a cable outlet 150 at or adjacent the rear surface 126. As shown most clearly in FIGS. 4 and 7, the inlets 142, 148 are spaced much further apart than the outlets 144, 150 in order to accommodate life rafts installed in both the right and left wing compartments. By way of example, when the guide block 90 is installed in the second chamber 38 of the left wing compartment 30, the deployment cable 80 extends through the generally C-shaped conduit 146, as shown in FIG. 4. Likewise, when the guide block is installed in the second chamber of the right wing compartment 30, the deployment cable 80 extends through the generally S-shaped conduit 140.

In packaging the life raft for both left and right wing installations, it is preferred that there be only one life raft configuration and one folding procedure such that the life raft can be installed in either wing without modification to the life raft or the aircraft. Accordingly, the outlets 144, 150 positioned at the rear surface 126 of the guide block facing the life raft assembly are preferably situated close together. However, if different configurations for the life raft are used, the spacing of the outlets, as well as the shape of the conduits, can greatly vary. The S-shaped conduit 140 is longer in length than the C-shaped conduit 146 to take up the extra slack in the deployment cable that generally occurs in the right wing installation of some aircraft.

The cable guide block 90 is preferably constructed by preforming guiding tubes into the C and S shapes. The tubes are preferably constructed of a material that exhibits a low coefficient of friction and high wear resistance to thereby minimize pull forces during deployment of the life raft from the cockpit or other area of the aircraft. The inside diameter of the tubes are chosen to permit free sliding movement of the deployment cable 80 therethrough, while reducing or eliminating vibration in the cable during aircraft operation.

In one embodiment of the invention the guiding tubes can be placed in a mold and a two-part mixture comprising a resin material and a reactive material is added to the mold to make a solid foam material that surrounds and holds the tubes. Once cured, the guide block 90 can be removed from the mold and secured in the aircraft as previously described.

As shown in FIGS. 10–13, a cable guide block 90A in accordance with a second embodiment of the invention is illustrated, wherein like parts in the previous embodiment are represented by like numerals. The cable guide block 90A is similar in construction to the cable guide block 90 with the exception that the block 90A is wider and taller, and the sides 128, 130 are more sloped, than the block 90 to accommodate a different compartment shape. Thus, it will be understood that the cable guide block can be constructed in a variety of shapes and sizes to thereby conform to a variety of compartments in which it will be installed. In this manner, slack in the cable, as well as cable vibration during operation of the aircraft is substantially reduced or eliminated.

With the above-described arrangement, in accordance with the invention, the relatively small size of the life raft, whether vacuum-packed or not, together with the guide block, serve to reduce the number of different parts needed for the aircraft, as well as simplifying the installation or removal of the life raft system. This is a great advantage over prior art systems where different life raft configurations and deployment systems are required.

While the invention has been taught with specific reference to the above-described embodiments, those skilled in the art will recognize that changes can be made in form and detail without departing from the spirit and the scope of the invention. For example, although the deployment arrangement has been described for use with non-vacuum-packed or vacuum-packed life rafts, it will be understood that the deployment arrangement is operable with the life rafts having different designs and/or configurations as long as they do not require the pressurized container to be positioned inside the retainer area of the wing compartment. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An arrangement for deployment of an inflatable structure, the arrangement comprising:
   a container fluidly connectable to the inflatable structure, the container having a pressurized fluid situated therein and a valve movable under force from a closed position while maintaining the pressurized fluid in the container to an open position in which the pressurized fluid is expelled from the container into the inflatable structure for its inflation;
   a cable guide block having first and second sides spaced from each other, and at least a first conduit and a second conduit extending between the first and second sides;
   a deployment cable positioned for guided movement in the first and second conduits between a rest position and a deployed position, the deployment cable having first and second ends situated distantly from the first and second sides, respectively, with the first end being operably connected to the valve and the second end being accessible for applying a pull force to the deployment cable;
   wherein guided movement of the deployment cable in the first and second conduits from the rest position to the deployed position under the applied pull force causes opening of the valve and inflation of the inflatable structure by the pressurized fluid.

2. An arrangement according to claim 1, wherein each of the first and second conduits comprises an outlet end associated with the first side and an inlet end associated with the second side, and further wherein a distance between the inlet ends is greater than a distance between the outlet ends.

3. An arrangement according to claim 2, wherein one of the first and second conduits is generally S-shaped in configuration to thereby accommodate one of a left-hand and right-hand system configuration.

4. An arrangement according to claim 3, wherein the other of the first and second conduits is generally C-shaped in configuration to accommodate the other of the left-hand and right-hand system configuration.

5. An arrangement according to claim 2, wherein the outlet ends are situated at the side of the guide block facing the container having the pressurized fluid and the inlet ends are situated at the side of the guide block remote from the container.

6. An arrangement according to claim 1, wherein the first and second conduits comprise a tubular member constructed of a material with low friction and wear characteristics, and the cable guide block is constructed of a foam material that surrounds the tubular member.

7. An arrangement for deployment of a life raft in an aircraft having left and right wings, a wing compartment located in each wing with a first chamber for receiving the life raft and a second chamber which is independent of the first chamber, and an aircraft cable for remotely actuating the life raft, the arrangement comprising:
   a life raft adapted for positioning in the first chamber;
   a container adapted for positioning in the first chamber with the life raft, the container being fluidly connectable to the life raft and having a compressed fluid situated therein and a valve movable under force from a closed position while maintaining the compressed fluid in the container to an open position in which the compressed fluid is expelled from the container into the life raft for its inflation;
   a cable guide block being adapted for positioning in the second chamber, the cable guide block having first and second sides, and at least a first conduit extending between the first and second sides;
   a deployment cable positioned for guided movement in the first conduit between a rest position and a deployed position, the deployment cable having first and second ends situated distantly from the first and second sides, respectively, with the first end being operably connected to the valve and the second end being adapted for connection to the aircraft cable for remotely applying a pull force to the deployment cable;
   wherein guided movement of the deployment cable in the at least first conduit from the rest position to the deployed position under the applied pull force causes opening of the valve and inflation of the life raft by the pressurized fluid.

8. An arrangement according to claim 7, wherein the cable guide block is shaped to conform to a shape of the second chamber.

9. An arrangement according to claim 8, and further comprising a holding device for holding the cable guide block in the second chamber.

10. An arrangement according to claim 9, wherein the holding device comprises adjustable straps that extend around the cable guide block.

11. An arrangement according to claim 7, and further comprising a quick disconnect device positioned on one end of the deployment cable for connecting with and disconnecting from the container, such that the system can be removed from the aircraft by accessing the wing compartment only from above its associated wing and disconnecting the quick disconnect device.

12. An arrangement according to claim 7, and further comprising a second conduit extending between the first and second sides for receiving the deployment cable.

13. An arrangement according to claim 12, wherein each of the first and second conduits comprises an outlet end associated with the first side and an inlet end associated with the second side, and further wherein a distance between the inlet ends is greater than a distance between the outlet ends.

14. An arrangement according to claim 13, wherein one of the first and second conduits is generally S-shaped in configuration to thereby accommodate one of a left wing compartment and a right wing compartment.

15. An arrangement according to claim 14, wherein the other of the first and second conduits is generally C-shaped in configuration to accommodate the other of the left wing and right wing compartments.

16. An arrangement according to claim 15, wherein the first and second conduits comprise tubular members constructed of a material with low friction and wear characteristics, and the cable guide block is constructed of a foam material that surrounds the tubular members.

17. An arrangement according to claim 13, wherein the outlet ends of the conduits are situated at the side of the guide block facing the container having the pressurized fluid and the inlet ends are situated at the side of the guide block remote from the container.

18. An arrangement according to claim 15, wherein the generally C-shaped conduit accommodates the left wing compartment and the generally S-shaped conduit accommodates the right wing compartment.

* * * * *